(12) United States Patent
Cabral et al.

(10) Patent No.: US 8,712,183 B2
(45) Date of Patent: Apr. 29, 2014

(54) SYSTEM AND METHOD FOR PERFORMING IMAGE CORRECTION

(75) Inventors: Brian Cabral, San Jose, CA (US); Hu He, Santa Clara, CA (US); Elena Ing, Santa Clara, CA (US); Sohei Takemoto, Fremont, CA (US)

(73) Assignee: Nvidia Corporation, Santa Clara, CA (US)

( * ) Notice: Subject to any disclaimer, the term of this patent is extended or adjusted under 35 U.S.C. 154(b) by 565 days.

(21) Appl. No.: 12/753,775

(22) Filed: Apr. 2, 2010

(65) Prior Publication Data

US 2010/0266201 A1 Oct. 21, 2010

Related U.S. Application Data

(60) Provisional application No. 61/170,014, filed on Apr. 16, 2009.

(51) Int. Cl.
*G06K 9/40* (2006.01)
*H04N 5/357* (2011.01)
*G06T 17/30* (2006.01)

(52) U.S. Cl.
CPC .............. *H04N 5/3572* (2013.01); *G06T 17/30* (2013.01)
USPC ........................................................ 382/274

(58) Field of Classification Search
USPC ................. 382/274, 275, 276, 293, 300, 167; 345/419
See application file for complete search history.

(56) References Cited

U.S. PATENT DOCUMENTS

| | | | |
|---|---|---|---|
| 3,904,818 | A | 9/1975 | Kovac |
| 4,253,120 | A | 2/1981 | Levine |
| 4,646,251 | A | 2/1987 | Hayes et al. |
| 4,685,071 | A | 8/1987 | Lee |
| 4,739,495 | A | 4/1988 | Levine |
| 4,771,470 | A | 9/1988 | Geiser et al. |
| 4,920,428 | A | 4/1990 | Lin et al. |
| 4,987,496 | A | 1/1991 | Greivenkamp, Jr. |
| 5,175,430 | A | 12/1992 | Enke et al. |

(Continued)

FOREIGN PATENT DOCUMENTS

| | | |
|---|---|---|
| CN | 1275870 | 12/2000 |
| EP | 0392565 | 10/1990 |

(Continued)

OTHER PUBLICATIONS

"A Pipelined Architecture for Real-Time Correction of Barrel Distortion in Wide-Angle Camera Images", Hau, T. Ngo, Student Member, IEEE and Vijayan K. Asari, Senior Member IEEE, IEEE Transaction on Circuits and Systems for Video Technology: vol. 15 No. 3 Mar. 2005 pp. 436-444.

(Continued)

*Primary Examiner* — Yon Couso

(57) ABSTRACT

A system and method for correcting image data. Embodiments of the present invention provide image correction to overcome various lens effects, optical crosstalk, and electrical crosstalk. In one embodiment, the method includes accessing, within an electronic system, a plurality of control points for a patch of a spline surface and calculating a plurality of intermediate control points corresponding to a row of pixels of the patch. The method further includes receiving a pixel of an image and correcting the pixel based on the plurality of intermediate control points in streaming scanline column-wise or row-wise order.

20 Claims, 9 Drawing Sheets

(56) References Cited

U.S. PATENT DOCUMENTS

| | | | |
|---|---|---|---|
| 5,261,029 A | 11/1993 | Abi-Ezzi et al. | |
| 5,305,994 A | 4/1994 | Matsui et al. | |
| 5,387,983 A | 2/1995 | Sugiura et al. | |
| 5,475,430 A | 12/1995 | Hamada et al. | |
| 5,513,016 A | 4/1996 | Inoue | |
| 5,608,824 A | 3/1997 | Shimizu et al. | |
| 5,652,621 A | 7/1997 | Adams, Jr. et al. | |
| 5,793,433 A | 8/1998 | Kim et al. | |
| 5,878,174 A | 3/1999 | Stewart et al. | |
| 5,903,273 A | 5/1999 | Mochizuki et al. | |
| 5,905,530 A | 5/1999 | Yokota et al. | |
| 5,995,109 A | 11/1999 | Goel et al. | |
| 6,016,474 A | 1/2000 | Kim et al. | |
| 6,078,331 A | 6/2000 | Pulli et al. | |
| 6,111,988 A * | 8/2000 | Horowitz et al. | 382/249 |
| 6,118,547 A | 9/2000 | Tanioka | |
| 6,128,000 A | 10/2000 | Jouppi et al. | |
| 6,141,740 A | 10/2000 | Mahalingaiah et al. | |
| 6,151,457 A | 11/2000 | Kawamoto | |
| 6,175,430 B1 | 1/2001 | Ito | |
| 6,252,611 B1 | 6/2001 | Kondo | |
| 6,256,038 B1 * | 7/2001 | Krishnamurthy | 345/419 |
| 6,281,931 B1 | 8/2001 | Tsao et al. | |
| 6,289,103 B1 | 9/2001 | Sako et al. | |
| 6,314,493 B1 | 11/2001 | Luick | |
| 6,319,682 B1 | 11/2001 | Hochman | |
| 6,323,934 B1 | 11/2001 | Enomoto | |
| 6,392,216 B1 | 5/2002 | Peng-Tan | |
| 6,396,397 B1 | 5/2002 | Bos et al. | |
| 6,438,664 B1 | 8/2002 | McGrath et al. | |
| 6,469,707 B1 | 10/2002 | Voorhies | |
| 6,486,971 B1 | 11/2002 | Kawamoto | |
| 6,504,952 B1 | 1/2003 | Takemura et al. | |
| 6,584,202 B1 | 6/2003 | Montag et al. | |
| 6,594,388 B1 | 7/2003 | Gindele et al. | |
| 6,683,643 B1 | 1/2004 | Takayama et al. | |
| 6,707,452 B1 | 3/2004 | Veach | |
| 6,724,423 B1 | 4/2004 | Sudo | |
| 6,724,932 B1 | 4/2004 | Ito | |
| 6,737,625 B2 | 5/2004 | Baharav et al. | |
| 6,760,080 B1 | 7/2004 | Moddel et al. | |
| 6,785,814 B1 | 8/2004 | Usami et al. | |
| 6,806,452 B2 | 10/2004 | Bos et al. | |
| 6,839,062 B2 | 1/2005 | Aronson et al. | |
| 6,856,441 B2 | 2/2005 | Zhang et al. | |
| 6,891,543 B2 | 5/2005 | Wyatt | |
| 6,900,836 B2 | 5/2005 | Hamilton, Jr. | |
| 6,950,099 B2 | 9/2005 | Stollnitz et al. | |
| 7,009,639 B1 | 3/2006 | Une et al. | |
| 7,015,909 B1 | 3/2006 | Morgan, III et al. | |
| 7,023,479 B2 | 4/2006 | Hiramatsu et al. | |
| 7,088,388 B2 | 8/2006 | MacLean et al. | |
| 7,092,018 B1 | 8/2006 | Watanabe | |
| 7,106,368 B2 | 9/2006 | Daiku et al. | |
| 7,133,041 B2 * | 11/2006 | Kaufman et al. | 345/419 |
| 7,133,072 B2 | 11/2006 | Harada | |
| 7,146,041 B2 | 12/2006 | Takahashi | |
| 7,221,779 B2 | 5/2007 | Kawakami et al. | |
| 7,227,586 B2 | 6/2007 | Finlayson et al. | |
| 7,245,319 B1 | 7/2007 | Enomoto | |
| 7,305,148 B2 | 12/2007 | Spampinato et al. | |
| 7,343,040 B2 | 3/2008 | Chanas et al. | |
| 7,486,844 B2 | 2/2009 | Chang et al. | |
| 7,502,505 B2 | 3/2009 | Malvar et al. | |
| 7,580,070 B2 | 8/2009 | Yanof et al. | |
| 7,626,612 B2 | 12/2009 | John et al. | |
| 7,627,193 B2 | 12/2009 | Alon et al. | |
| 7,671,910 B2 | 3/2010 | Lee | |
| 7,728,880 B2 | 6/2010 | Hung et al. | |
| 7,750,956 B2 | 7/2010 | Wloka | |
| 7,817,187 B2 | 10/2010 | Silsby et al. | |
| 7,859,568 B2 | 12/2010 | Shimano et al. | |
| 7,860,382 B2 | 12/2010 | Grip | |
| 7,912,279 B2 | 3/2011 | Hsu et al. | |
| 8,049,789 B2 | 11/2011 | Innocent | |
| 8,238,695 B1 | 8/2012 | Davey et al. | |
| 8,456,547 B2 | 6/2013 | Wloka | |
| 8,456,548 B2 | 6/2013 | Wloka | |
| 8,456,549 B2 | 6/2013 | Wloka | |
| 8,471,852 B1 | 6/2013 | Bunnell | |
| 2001/0001234 A1 | 5/2001 | Addy et al. | |
| 2001/0012113 A1 | 8/2001 | Yoshizawa et al. | |
| 2001/0012127 A1 | 8/2001 | Fukuda et al. | |
| 2001/0015821 A1 | 8/2001 | Namizuka et al. | |
| 2001/0019429 A1 | 9/2001 | Oteki et al. | |
| 2001/0021278 A1 | 9/2001 | Fukuda et al. | |
| 2001/0033410 A1 | 10/2001 | Helsel et al. | |
| 2001/0050778 A1 | 12/2001 | Fukuda et al. | |
| 2001/0054126 A1 | 12/2001 | Fukuda et al. | |
| 2002/0012131 A1 | 1/2002 | Oteki et al. | |
| 2002/0015111 A1 | 2/2002 | Harada | |
| 2002/0018244 A1 | 2/2002 | Namizuka et al. | |
| 2002/0027670 A1 | 3/2002 | Takahashi et al. | |
| 2002/0033887 A1 | 3/2002 | Hieda et al. | |
| 2002/0041383 A1 | 4/2002 | Lewis, Jr. et al. | |
| 2002/0044778 A1 | 4/2002 | Suzuki | |
| 2002/0054374 A1 | 5/2002 | Inoue et al. | |
| 2002/0063802 A1 | 5/2002 | Gullichsen et al. | |
| 2002/0105579 A1 | 8/2002 | Levine et al. | |
| 2002/0126210 A1 | 9/2002 | Shinohara et al. | |
| 2002/0146136 A1 | 10/2002 | Carter, Jr. | |
| 2002/0149683 A1 | 10/2002 | Post | |
| 2002/0158971 A1 | 10/2002 | Daiku et al. | |
| 2002/0167202 A1 | 11/2002 | Pfalzgraf | |
| 2002/0167602 A1 | 11/2002 | Nguyen | |
| 2002/0191694 A1 | 12/2002 | Ohyama et al. | |
| 2002/0196470 A1 | 12/2002 | Kawamoto et al. | |
| 2003/0035100 A1 | 2/2003 | Dimsdale et al. | |
| 2003/0067461 A1 | 4/2003 | Fletcher et al. | |
| 2003/0122825 A1 | 7/2003 | Kawamoto | |
| 2003/0142222 A1 | 7/2003 | Hordley | |
| 2003/0146975 A1 | 8/2003 | Joung et al. | |
| 2003/0169353 A1 | 9/2003 | Keshet et al. | |
| 2003/0169918 A1 | 9/2003 | Sogawa | |
| 2003/0197701 A1 | 10/2003 | Teodosiadis et al. | |
| 2003/0218672 A1 | 11/2003 | Zhang et al. | |
| 2003/0222995 A1 | 12/2003 | Kaplinsky et al. | |
| 2003/0223007 A1 | 12/2003 | Takane | |
| 2004/0001061 A1 | 1/2004 | Stollnitz et al. | |
| 2004/0001234 A1 | 1/2004 | Curry et al. | |
| 2004/0032516 A1 | 2/2004 | Kakarala | |
| 2004/0066970 A1 | 4/2004 | Matsugu | |
| 2004/0100588 A1 | 5/2004 | Hartson et al. | |
| 2004/0101313 A1 | 5/2004 | Akiyama | |
| 2004/0109069 A1 | 6/2004 | Kaplinsky et al. | |
| 2004/0189875 A1 | 9/2004 | Zhai et al. | |
| 2004/0218071 A1 | 11/2004 | Chauville et al. | |
| 2004/0247196 A1 | 12/2004 | Chanas et al. | |
| 2005/0007378 A1 | 1/2005 | Grove | |
| 2005/0007477 A1 | 1/2005 | Ahiska | |
| 2005/0030395 A1 | 2/2005 | Hattori | |
| 2005/0046704 A1 | 3/2005 | Kinoshita | |
| 2005/0099418 A1 | 5/2005 | Cabral et al. | |
| 2005/0111110 A1 | 5/2005 | Matama | |
| 2005/0175257 A1 | 8/2005 | Kuroki | |
| 2005/0185058 A1 | 8/2005 | Sablak | |
| 2005/0238225 A1 | 10/2005 | Jo et al. | |
| 2005/0243181 A1 | 11/2005 | Castello et al. | |
| 2005/0248671 A1 | 11/2005 | Schweng | |
| 2005/0261849 A1 | 11/2005 | Kochi et al. | |
| 2005/0286097 A1 | 12/2005 | Hung et al. | |
| 2006/0050158 A1 | 3/2006 | Irie | |
| 2006/0061658 A1 | 3/2006 | Faulkner et al. | |
| 2006/0087509 A1 | 4/2006 | Ebert et al. | |
| 2006/0119710 A1 | 6/2006 | Ben-Ezra et al. | |
| 2006/0133697 A1 | 6/2006 | Uvarov et al. | |
| 2006/0176375 A1 | 8/2006 | Hwang et al. | |
| 2006/0197664 A1 | 9/2006 | Zhang et al. | |
| 2006/0274171 A1 | 12/2006 | Wang | |
| 2006/0290794 A1 | 12/2006 | Bergman et al. | |
| 2006/0293089 A1 | 12/2006 | Herberger et al. | |
| 2007/0091188 A1 | 4/2007 | Chen et al. | |
| 2007/0147706 A1 | 6/2007 | Sasaki et al. | |
| 2007/0171288 A1 | 7/2007 | Inoue et al. | |

(56) References Cited

U.S. PATENT DOCUMENTS

| | | | |
|---|---|---|---|
| 2007/0236770 | A1 | 10/2007 | Doherty et al. |
| 2007/0247532 | A1 | 10/2007 | Sasaki |
| 2007/0285530 | A1 | 12/2007 | Kim et al. |
| 2008/0030587 | A1 | 2/2008 | Helbing |
| 2008/0043024 | A1 | 2/2008 | Schiwietz et al. |
| 2008/0062164 | A1 | 3/2008 | Bassi et al. |
| 2008/0101690 | A1 | 5/2008 | Hsu et al. |
| 2008/0143844 | A1 | 6/2008 | Innocent |
| 2008/0231726 | A1 | 9/2008 | John |
| 2009/0002517 | A1 | 1/2009 | Yokomitsu et al. |
| 2009/0010539 | A1 | 1/2009 | Guarnera et al. |
| 2009/0037774 | A1 | 2/2009 | Rideout et al. |
| 2009/0116750 | A1 | 5/2009 | Lee et al. |
| 2009/0128575 | A1 | 5/2009 | Liao et al. |
| 2009/0160957 | A1 | 6/2009 | Deng et al. |
| 2009/0257677 | A1 | 10/2009 | Cabral et al. |
| 2010/0266201 | A1 | 10/2010 | Cabral et al. |

FOREIGN PATENT DOCUMENTS

| | | |
|---|---|---|
| EP | 1449169 | 5/2003 |
| EP | 1378790 | 7/2004 |
| EP | 1447977 | 8/2004 |
| EP | 1550980 | 7/2005 |
| GB | 2045026 | 10/1980 |
| GB | 2363018 | 12/2001 |
| JP | 61187467 | 8/1986 |
| JP | 62151978 | 7/1987 |
| JP | 07015631 | 1/1995 |
| JP | 8036640 | 2/1996 |
| JP | 08-079622 | 3/1996 |
| JP | 2000516752 | 12/2000 |
| JP | 2001052194 | 2/2001 |
| JP | 2002-207242 | 7/2002 |
| JP | 2003-085542 | 3/2003 |
| JP | 2003085542 | 3/2003 |
| JP | 2004-221838 | 8/2004 |
| JP | 2005094048 | 4/2005 |
| JP | 2005-182785 | 7/2005 |
| JP | 2005520442 | 7/2005 |
| JP | 2006025005 | 1/2006 |
| JP | 2006086822 | 3/2006 |
| JP | 2006-094494 | 4/2006 |
| JP | 2006121612 | 5/2006 |
| JP | 2006134157 | 5/2006 |
| JP | 2007019959 | 1/2007 |
| JP | 2007-148500 | 6/2007 |
| JP | 2009021962 | 7/2007 |
| JP | 2007-233833 | 9/2007 |
| JP | 2007282158 | 10/2007 |
| JP | 2008085388 | 4/2008 |
| JP | 2008113416 | 5/2008 |
| JP | 2008277926 | 11/2008 |
| KR | 1020040043156 | 5/2004 |
| KR | 1020060068497 | 6/2006 |
| KR | 1020070004202 | 1/2007 |
| WO | 03/043308 A2 | 5/2003 |
| WO | 03043308 | 5/2003 |
| WO | 2004/063989 A2 | 7/2004 |
| WO | 2004063989 | 7/2004 |
| WO | 2007056459 | 5/2007 |
| WO | 2007093864 | 8/2007 |

OTHER PUBLICATIONS

"Calibration and removal of lateral chromatic aberration in images" Mallon, et al. Science Direct Copyright 2006; 11 pages.
"Method of Color Interpolation in a Single Sensor Color Camera Using Green Channel Seperation" Weerasighe, et al Visual Information Processing Lab, Motorola Austrailan Research Center pp. IV-3233-IV3236, 2002.
Kuno et al. "New Interpolation Method Using Discriminated Color Correlation for Digital Still Cameras" IEEE Transac. On Consumer Electronics, vol. 45, No. 1, Feb. 1999, pp. 259-267.
D. Doo, M. Sabin, "behaviour of recursive division surfaces near extraordinary points"; Sep. 1978; Computer Aided Design; vol. 10, pp. 356-360.
D. W. H. Doo; "A subdivision algorithm for smoothing down irregular shaped polyhedrons"; 1978; Interactive Techniques in Computer Aided Design; pp. 157-165.
Davis, J., Marschner, S., Garr, M., Levoy, M., Filling holes in complex surfaces using volumetric diffusion, Dec. 2001, Stanford University, pp. 1-9.
E. Catmull, J.Clark, "recursively generated B-Spline surfaces on arbitrary topological meshes"; Nov. 1978; Computer aided design; vol. 10; pp. 350-355.
J. Bolz, P. Schroder; "rapid evaluation of catmull-clark subdivision surfaces"; Web 3D '02.
M. Halstead, M. Kass, T. DeRose; "efficient, fair interpolation using catmull-clark surfaces"; Sep. 1993; Computer Graphics and Interactive Techniques, Proc; p. 35-44.
Donald D. Spencer, "Illustrated Computer Graphics Dictionary", 1993, Camelot Publishing Company, p. 272.
Duca et al., "A Relational Debugging Engine for Graphics Pipeline, International Conference on Computer Graphics and Interactive Techniques", ACM SIGGRAPH Jul. 2005, pp. 453-463.
gDEBugger, graphicRemedy, http://www.gremedy.com, Aug. 8, 2006, pp. 1-18.
Keith R. Slavin; Application As Filed entitled "Efficient Method for Reducing Noise and Blur in a Composite Still Image From a Rolling Shutter Camera"; U.S. Appl. No. 12/069,669, filed Feb. 11, 2008.
Ko et al., "Fast Digital Image Stabilizer Based on Gray-Coded Bit-Plane Matching", IEEE Transactions on Consumer Electronics, vol. 45, No. 3, pp. 598-603, Aug. 1999.
Ko, et al., "Digital Image Stabilizing Algorithms Basd on Bit-Plane Matching", IEEE Transactions on Consumer Electronics, vol. 44, No. 3, pp. 617-622, Aug. 1988.
Morimoto et al., "Fast Electronic Digital Image Stabilization for Off-Road Navigation", Computer Vision Laboratory, Center for Automated Research University of Maryland, Real-Time Imaging, vol. 2, pp. 285-296, 1996.
Paik et al., "An Adaptive Motion Decision system for Digital Image Stabilizer Based on Edge Pattern Matching", IEEE Transactions on Consumer Electronics, vol. 38, No. 3, pp. 607-616, Aug. 1992.
Parhami, Computer Arithmetic, Oxford University Press, Jun. 2000, pp. 413-418.
S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.
S. Erturk, "Real-Time Digital Image Stabilization Using Kalman Filters", http://www,ideallibrary.com, Real-Time Imaging 8, pp. 317-328, 2002.
Uomori et al., "Automatic Image Stabilizing System by Full-Digital Signal Processing", vol. 36, No. 3, pp. 510-519, Aug. 1990.
Uomori et al., "Electronic Image Stabiliztion System for Video Cameras and VCRs", J. Soc. Motion Pict. Telev. Eng., vol. 101, pp. 66-75, 1992.
E. Catmull, J. Clark, "recursively generated B-Spline surfaces on arbitrary topological meshes"; Nov. 1978; Computer aided design; vol. 10; pp. 350-355.
J. Bolz, P. Schroder; "rapid evaluation of catmull-clark subdivision surfaces"; Web 3D '02 , 2002.
J. Stam; "Exact Evaluation of Catmull-clark subdivision surfaces at arbitrary parameter values"; Jul. 1998; Computer Graphics; vol. 32; pp. 395-404.
Krus, M., Bourdot, P., Osorio, A., Guisnel, F., Thibault, G., Adaptive tessellation of connected primitives for interactive walkthroughs in complex industrial virtual environments, Jun. 1999, Proceedings of the Eurographics workshop, pp. 1-10.
Kumar, S., Manocha, D., Interactive display of large scale trimmed NURBS models, 1994, University of North Carolina at Chapel Hill, Technical Report, pp. 1-36.
Loop, C., DeRose, T., Generalized B-Spline surfaces of arbitrary topology, Aug. 1990, SIGGRAPH 90, pp. 347-356.
M. Halstead, M. Kass, T. DeRose; "efficient, fair interpolation using catmull-clark surfaces"; Sep. 1993; Computer Graphics and Interactive Techniques, Proc; pp. 35-44.

(56) References Cited

OTHER PUBLICATIONS

T. DeRose, M. Kass, T. Truong; "subdivision surfaces in character animation"; Jul. 1998; Computer Graphics and Interactive Techniques, Proc; pp. 85-94.

Takeuchi, S., Kanai, T., Suzuki, H., Shimada, K., Kimura, F., Subdivision surface fitting with QEM-based mesh simplification and reconstruction of approximated B-spline surfaces, 2000, Eighth Pacific Conference on computer graphics and applications, pp. 202-212.

Goshtasby, Ardeshir; "Correction of Image Deformation From Lens Distortion Using Bezier Patches"; 1989; Computer Vision, Graphics, and Image Processing, vol. 47; pp. 358-394.

* cited by examiner

SYSTEM AND METHOD FOR PERFORMING IMAGE CORRECTION

RELATED U.S. APPLICATIONS

This application claims the benefit of and priority to the copending provisional patent application Ser. No. 61/170,014, entitled "SYSTEM AND METHOD FOR IMAGE CORRECTION," with filing date Apr. 16, 2009, and hereby incorporated by reference in its entirety.

This application is related to copending non-provisional patent application Ser. No. 12/752,878, entitled "SYSTEM AND METHOD FOR IMAGE CORRECTION," with filing date Apr. 1, 2010, and hereby incorporated by reference in its entirety.

FIELD OF THE INVENTION

Embodiments of the present invention are generally related to digital image signal processing.

BACKGROUND OF THE INVENTION

As technology has advanced, cameras have advanced accordingly but still face certain persistent issues. Particularly, as light passes through a camera lens, the light is bent as the light refracts. This bending of light results in inconsistent brightness across the sensor such that areas in the middle are much brighter than areas on the edges. Variations or imperfections in the lens have an increasing impact on the inconsistency of light coming out of the lens. Further, light may get stuck or not pass through as a result of interacting with the lens housing. This distortion is known as lens shading or vignetting. Thus, light coming through a lens system and forming an image on a film plane (digital sensor or film) will be unevenly attenuated across the image plane and color spectrum due to imperfections in the lens and due to the angle of the light as it strikes image forming medium (film or digital array of sensors) in particular the color filter array which filters the light and guides it into the image forming device. The overall result is that if a "flat" field of light enters the lens, then the film or digital sensor nevertheless receives an "unflat" field of light with varying brightness and color.

Conventionally, a high order polynomial may be used to represent this distortion and can be applied across the image plane to attempt to overcome the impact of lens shading and lens imperfections thereby correcting the image. However, high order polynomials are computationally expensive and are complicated to execute on hardware of fixed precision. For example, a $10^{th}$ power polynomial may have 100 individual terms and a high order polynomial may require evaluation at each pixel meaning that, for instance, after 20 pixels, the amount of computations required increases rapidly. Further, higher order polynomials are numerically unstable as small variations can result in large changes in the polynomial. Also, as one changes a surface defined by a polynomial to the $9^{th}$ or $10^{th}$ order, the polynomial coefficients provide little intuition as to the magnitude of the changes in the surface value in any direction. All these characteristics make polynomial representation not a viable solution for the lens shading problem in terms of being computationally intensive and not intuitive.

SUMMARY OF THE INVENTION

Accordingly, what is needed is a system and method for correcting image data in an efficient manner. Embodiments provide for separably processing portions (e.g., patches) of an image based on spline surfaces (e.g., a Bezier surface) to correct for b distortions, e.g., from vignetting. The use of spline surfaces facilitates efficient hardware implementations (e.g., via linear interpolators) and provides an intuitive and computationally stable selection. Embodiments further correct pixels as the pixels are received from the sensor for a variety of effects including lens shading effects (vignetting), optical crosstalk, and electrical crosstalk. Moreover, the image correction may be performed on a per channel and illumination type basis.

In one embodiment, the present invention includes a computer implemented method for image signal processing. In one embodiment, the method includes accessing, within an electronic system, a plurality of control points for a Bezier surface or an array of Bezier patches and calculating a plurality of intermediate control points corresponding to a row of pixels of the patch. The method further includes receiving a pixel of an image and correcting the pixel based on the plurality of intermediate control points. The pixel is located in the row pixels of the patch. Because of the separable formulation of the spline patch approach pixels can then be received and corrected in scan line order as a stream on "a row of a patch" basis with a corrected image being output when each patch of the surface has been corrected. It is understood that in another embodiment that "columns of a patch" can be interchanged for "a row of a patch."

In another embodiment, the present invention is implemented as an image signal processing system. The system includes a pixel receiving module operable to receive a plurality of pixels from an optical sensor (e.g., CMOS sensor or CCD sensor) and a control points access module operable to access control points of a Bezier surface (or any other spline surface). The system further includes an intermediate control points module operable to determine a plurality of intermediate control points for a plurality of pixels corresponding to a patch of the Bezier surface and a pixel correction module operable to correct pixels based on the plurality of intermediate control points (e.g., on a row by row basis of a patch).

In yet another embodiment, the present invention is implemented as a method for image signal processing. The method includes accessing, within an electronic system, a plurality of control points for a patch of a spline surface and calculating a plurality of intermediate control points corresponding to a row of pixels for each color channel of an image. The method further includes receiving a plurality of pixels and adjusting the plurality of pixels based on the plurality of intermediate control points and respective horizontal locations of the plurality of pixels. The plurality of pixels may include pixels located on rows of pixels corresponding to the horizontal positions of the patch of the spline surface and the plurality of pixels may comprise a plurality of color channels of an image.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
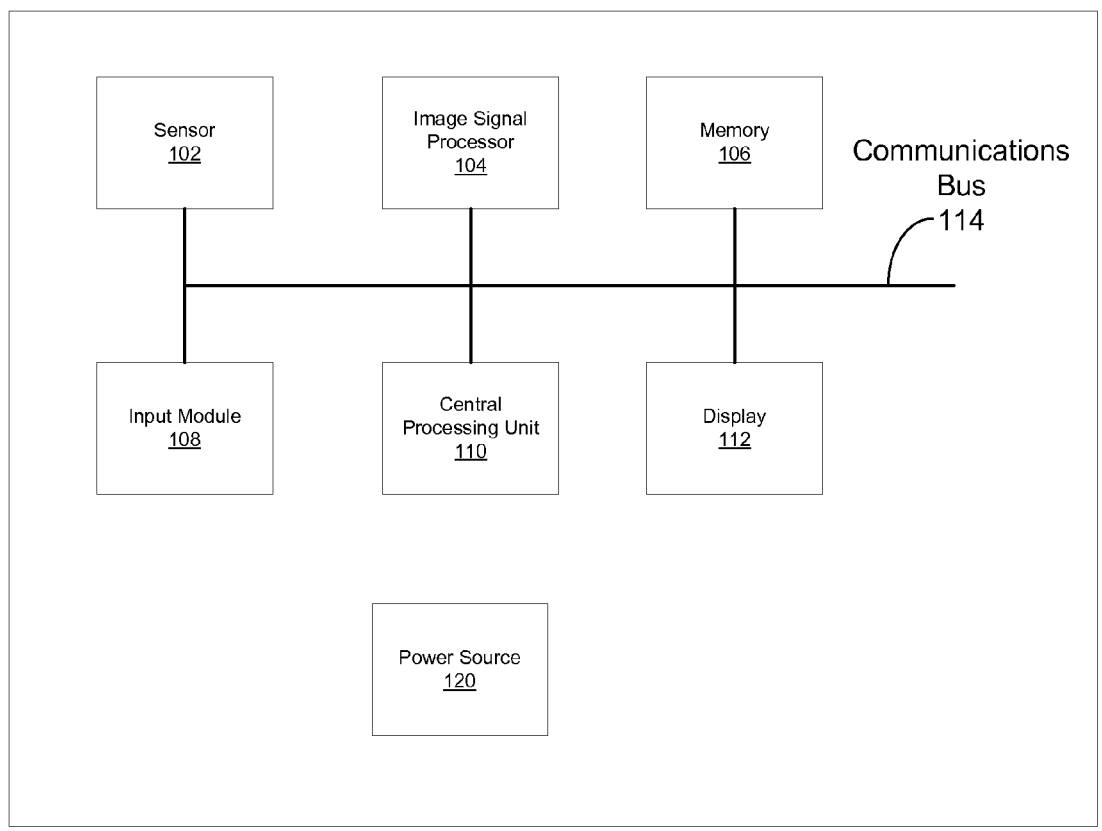
FIG. 1 shows an exemplary operating environment in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Operating Environment:

FIG. 1 shows an exemplary operating environment in accordance with one embodiment of the present invention. System 100 includes sensor 102, image signal processor (ISP) 104, memory 106, input module 108, central processing unit (CPU) 110, display 112, communications bus 114, and power source 120. Power source 120 provides power to system 100 and may be a DC or AC power source. System 100 depicts the components of a basic system in accordance with embodiments of the present invention providing the execution platform for certain hardware-based and software-based functionality. Although specific components are disclosed in system 100, it should be appreciated that such components are examples. That is, embodiments of the present invention are well suited to having various other components or variations of the components recited in system 100. It is appreciated that the components in system 100 may operate with other components other than those presented, and that not all of the components of system 100 may be required to achieve the goals of system 100.

CPU 110 and the ISP 104 can also be integrated into a single integrated circuit die and CPU 110 and ISP 104 may share various resources, such as instruction logic, buffers, functional units and so on, or separate resources may be provided for image processing and general-purpose operations. System 100 can be implemented as, for example, a digital camera, cell phone camera, portable device (e.g., audio device, entertainment device, handheld device), webcam, video device (e.g., camcorder) and the like.

Sensor 102 receives light via a lens (not shown) and converts the light received into a signal (e.g., digital or analog). Sensor 102 may be any of a variety of optical sensors including, but not limited to, complementary metal-oxide-semiconductor (CMOS) or charge-coupled device (CCD) sensors. Sensor 102 is coupled to communications bus 114 and may provide image data received over communications bus 114.

Image signal processor (ISP) 104 is coupled to communications bus 114 and processes the signal generated by sensor 102. More specifically, image signal processor 104 processes data from sensor 102 for storing in memory 106. For example, image signal processor 104 may compress and determine a file format for an image to be stored in within memory 106.

Input module 108 allows entry of commands into system 100 which may then, among other things, control the sampling of data by sensor 102 and subsequent processing by ISP 104. Input module 108 may include, but it not limited to, navigation pads, keyboards (e.g., QWERTY), up/down buttons, touch screen controls (e.g., via display 112) and the like.

Central processing unit (CPU) 110 receives commands via input module 108 and may control a variety of operations including, but not limited to, sampling and configuration of sensor 102, processing by ISP 104, and management (e.g., addition, transfer, and removal) of images and/or video from memory 106.

Embodiments provide for seperably processing portions (e.g., patches) of image based on spline surfaces (e.g., a Bezier surface). The use of spline surfaces facilitates efficient hardware implementations (e.g., via linear interpolators) and provides an intuitive and computationally stable selection. Embodiments further correct pixels as the pixels are received for a variety of effects including lens shading effects, optical crosstalk, and electrical crosstalk. The image correction may be performed on a per channel and illumination type basis. Embodiments of the present invention are operable to correct images based on any of a variety of spline surfaces.

Figure 2A:
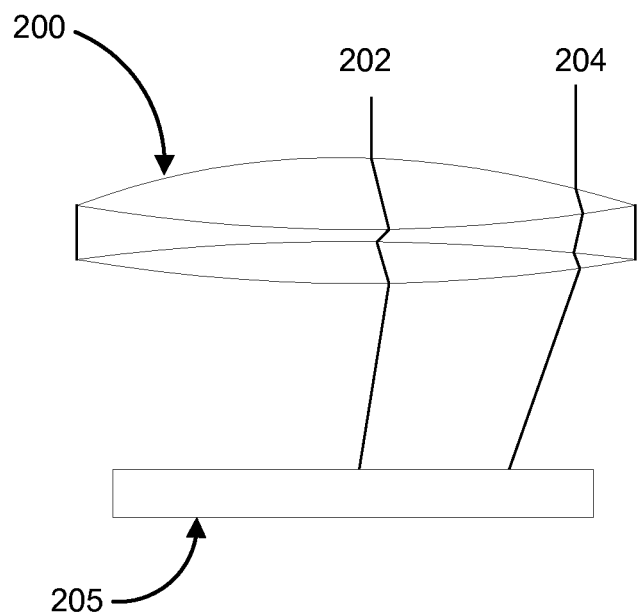
FIG. 2a shows a block diagram of an exemplary lens operable to be used with one embodiment of the present invention.

FIG. 2a shows a block diagram of an exemplary lens operable to be used with one embodiment of the present invention. Lens 200 is a lens operable to be used in an image or video capture device (e.g., camera, digital camera, webcam, camcorder, portable device, cell phone, and the like). Lens 200 may be made of a variety of materials including, but not limited to, glass, plastic, or a combination thereof. Light ray 202 enters lens 200 substantially near the center of lens 200. Light ray 202 is bent as light ray 202 is refracted as it passes through lens 200. Light ray 204 enters lens 200 substantially near an edge of lens 200. As substantially illustrated, light ray 204 is bent by a substantially greater amount than light ray 202 thereby resulting at the sensor 205 in a difference in brightness between light received substantially near the center of lens 200 and the edge of lens 200. This distortion is known as lens shading or vignetting.

Figure 2B:
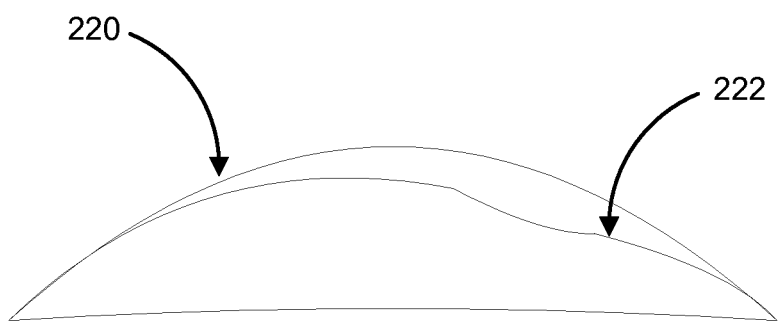
FIG. 2b shows a block diagram of another exemplary lens operable to be used with one embodiment of the present invention.

FIG. 2b shows a block diagram of an exemplary lens operable to be used with one embodiment of the present invention. Line 220 depicts a well shaped lens (e.g., lens 200). Lens 222 depicts a misshapen lens which may be more realistic of a lens in a variety of devices. It is appreciated that the effects of misshapen lens 222 may further impact the bending of light as it passes through lens 222. Embodiments of the present invention compensate and overcome the effects of light being bent by the lens and irregularities in the shape of lenses (e.g., lens 222). It is appreciated that lenses may have a variety of defects including, but not limited to, lopsidedness and waviness. It is further appreciated that variations in manufacturing processes of a lens can alter the location of the brightest spot. Of particular note, portable devices (e.g., cell phones) and low cost devices may have lenses that are plastic and not well constructed.

Figure 3:
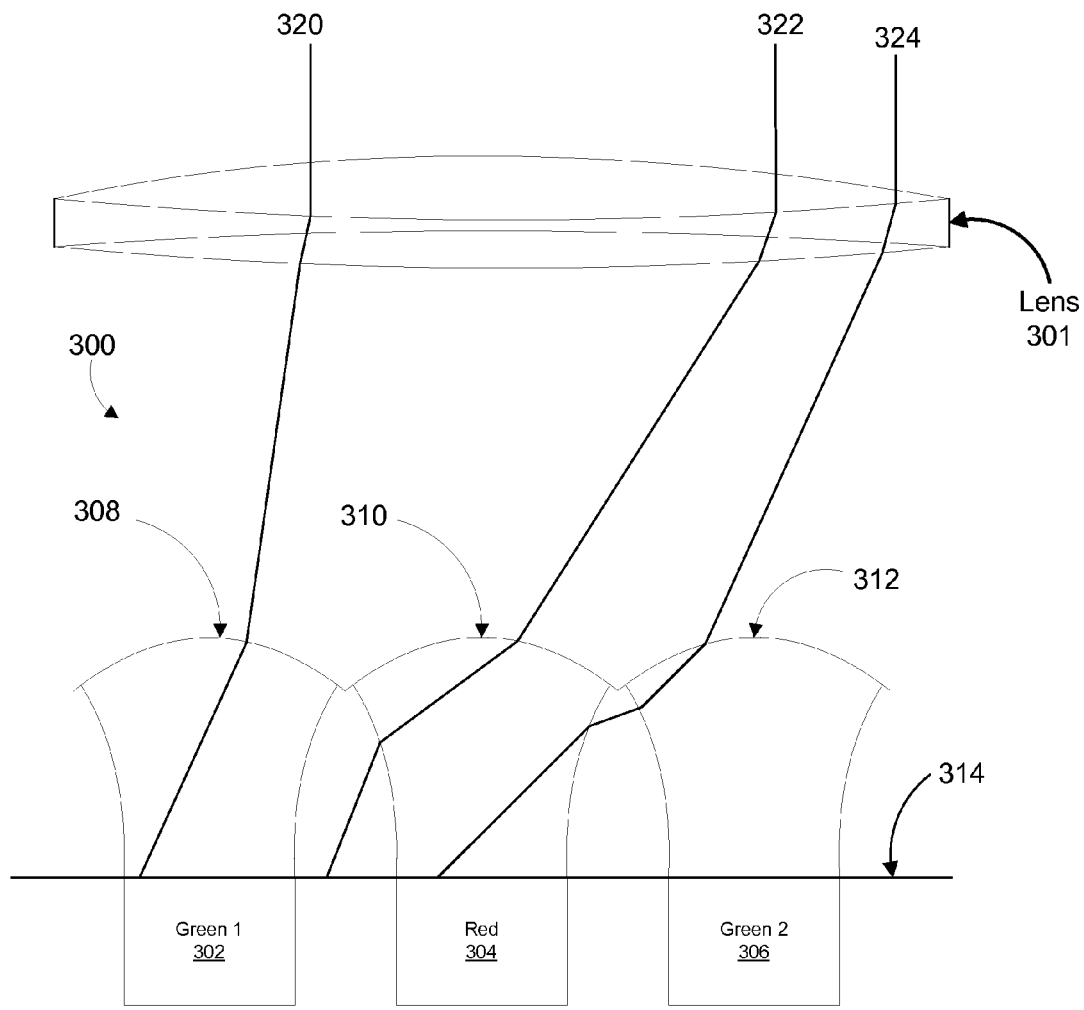
FIG. 3 shows a diagram of an exemplary color filter array in accordance with one embodiment of the present invention.

FIG. 3 shows a diagram of an exemplary color filter array of a sensor device in accordance with one embodiment of the present invention. Color filter array 300 includes substrate 314, green 1 filter 308, red filter 310, green 2 filter 312, green 1 sensor 302, red sensor 304, and green 2 sensor 306. Light is received by color filter array 300 via lens 301. Sensors 302-306 may be part of a CMOS sensor operable to capture images and arranged in a Bayer filter configuration however any color configuration can be used. It is appreciated that green filters 308 and 312 may filter different spectra of green light on green sensors 302 and 306, respectively.

Embodiments of the present invention compensate for bending of light as light of different colors passes through a lens and falls on a color filter array (e.g., color filters 308-312 and sensor array 300). For example, light ray 320 is bent due to light ray 320 being refracted as it passes through lens 301 and green 1 filter 308. Embodiments of the present invention are further operable to compensate for optical crosstalk. Optical crosstalk can occur when light rays are bent as the light ray is refracted as it passes through more than one color filter prior to reaching a sensor. For example, light ray 324 is bent due to being refracted as it passes through lens 301, green 2 filter 312, and then red filter 310 then reaches red sensor 304. It is noted that as light ray 324 passes through red filter 310 and green 2 filter 312, light ray is filtered in a manner not intended by the design of color filter array 300.

Embodiments of the present invention are further operable to compensate for electrical crosstalk. Electrical crosstalk can occur when light rays are bent and reach the material between sensors. For example, light ray 322 is bent due to being refracted upon passing through lens 301 and red filter 310 and then reaches substrate 314. Upon reaching substrate 314, photons of light ray 322 may impact the performance of sensors (e.g., green 1 sensor 302 and red sensor 304). Such impacts may include increasing electrical leakage among components of sensors 302 and 304 (e.g., well leakage).

It is appreciated that embodiments of the present invention may correct image data for a variety of sensor configurations including, but not limited to, panchromatic cells and vertical color filters. It is further appreciated that different types of lighting e.g., of different color temperature, may result in different bending of light as light goes through filters 308-312. Therefore, embodiments use different sets of control points per illuminate. For example, embodiments may utilize a different set of control points for each illuminate (e.g., florescent, tungsten, and daylight) for each color channel.

It is further understood that the present invention is operable to use any type of spline and is not limited to just the Bezier formulation but any formulation with similar characteristics including, but not limited, to B-Splines, wavelet splines, and thin-plate splines.

Figure 4:
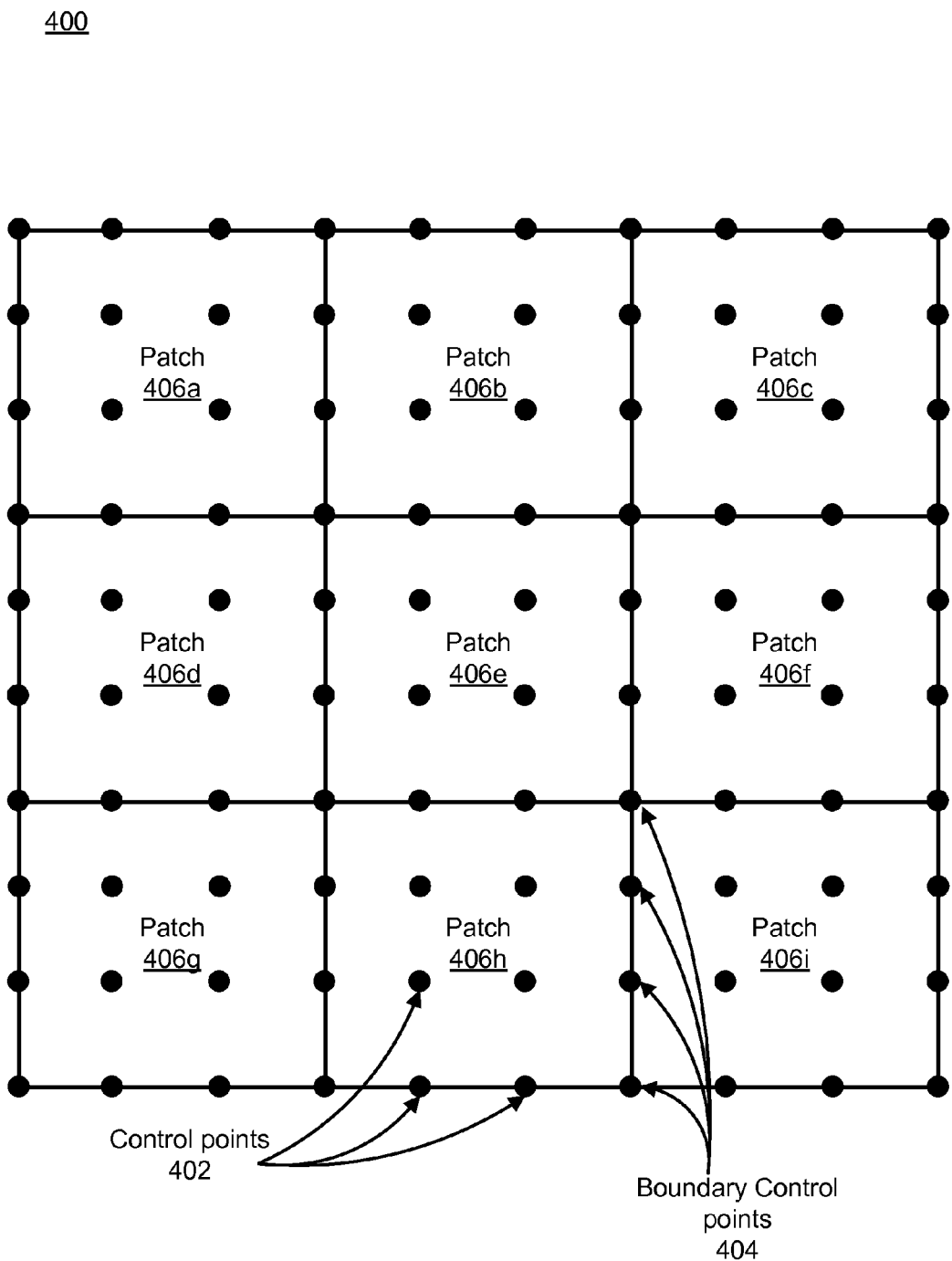
FIG. 4 shows an exemplary Bezier surface with exemplary control points in accordance with one embodiment of the present invention.

FIG. 4 shows an exemplary Bezier surface with exemplary control points in accordance with one embodiment of the present invention. Bezier surface 400 includes patches 406a-i. Bezier surface 400 includes exemplary control points 402 and exemplary boundary control points 404. The control points may be located on boundaries of Bezier patches and thus may be shared between Bezier patches. Bezier patches are coupled together along boundary control points, for instance boundary control points 404. Each Bezier patch further includes control points, for instance control points 402. Control points define the shape of each Bezier patch. Boundary control points 404 are shared between patches 406h and 406i. The sharing of boundary points conserves storage in addition to ensuring that Bezier surface 400 is continuous between adjacent patches.

Embodiments of the present invention are operable to handle any number of patches. The use of the patches allows embodiments of the present invention to scale to any number of pixels. In one embodiment, Bezier surface 400 includes nine Bezier patches. The control points may be equally spaced. As illustrated, the boundaries of the patches share control points thereby reducing the number of control points necessary and ensuring positional continuity between patches. In one exemplary embodiment, each patch has 16 control points which are shared boundary control points for a total of 100 control points per channel (e.g., color channel).

Figure 5:
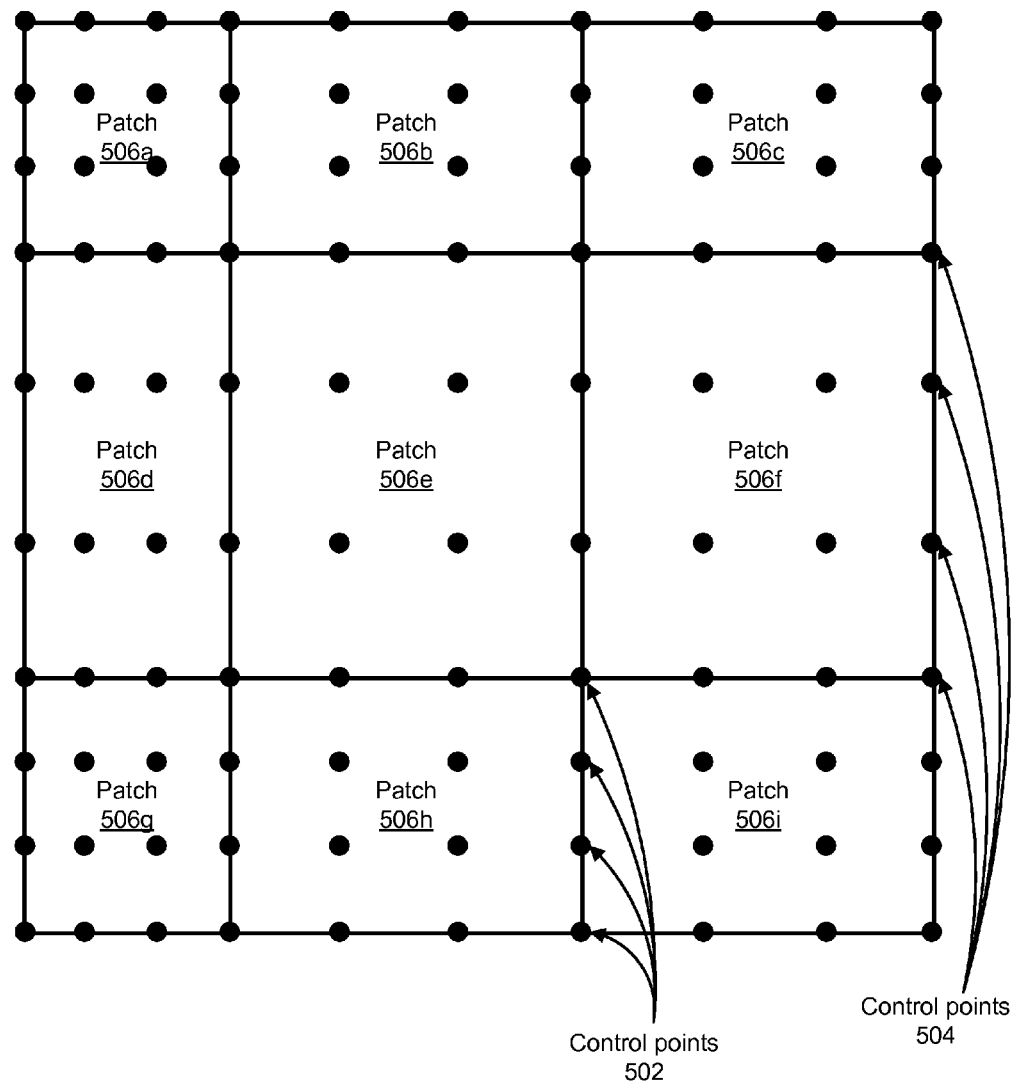
FIG. 5 shows another exemplary Bezier surface with exemplary adjusted control points in accordance with one embodiment of the present invention.

FIG. 5 shows another exemplary Bezier surface with exemplary adjusted control points in accordance with one embodiment of the present invention. FIG. 5 shows an embodiment of the present invention where the interior boundaries can be independently and arbitrarily adjusted. Such adjustments may be made to fit particular Bezier surfaces (e.g., significant lens shading effects). Bezier surface 600 includes patches 506a-i. Bezier surface 500 includes control points 502 and control points 504. Control points 502 are more closely spaced than control points 504. The adjustment of the interior boundaries can effectively increase or decrease the size of a particular patch or group of patches (e.g., patch 502c, patch 502f, and patch 502i).

Figure 6:
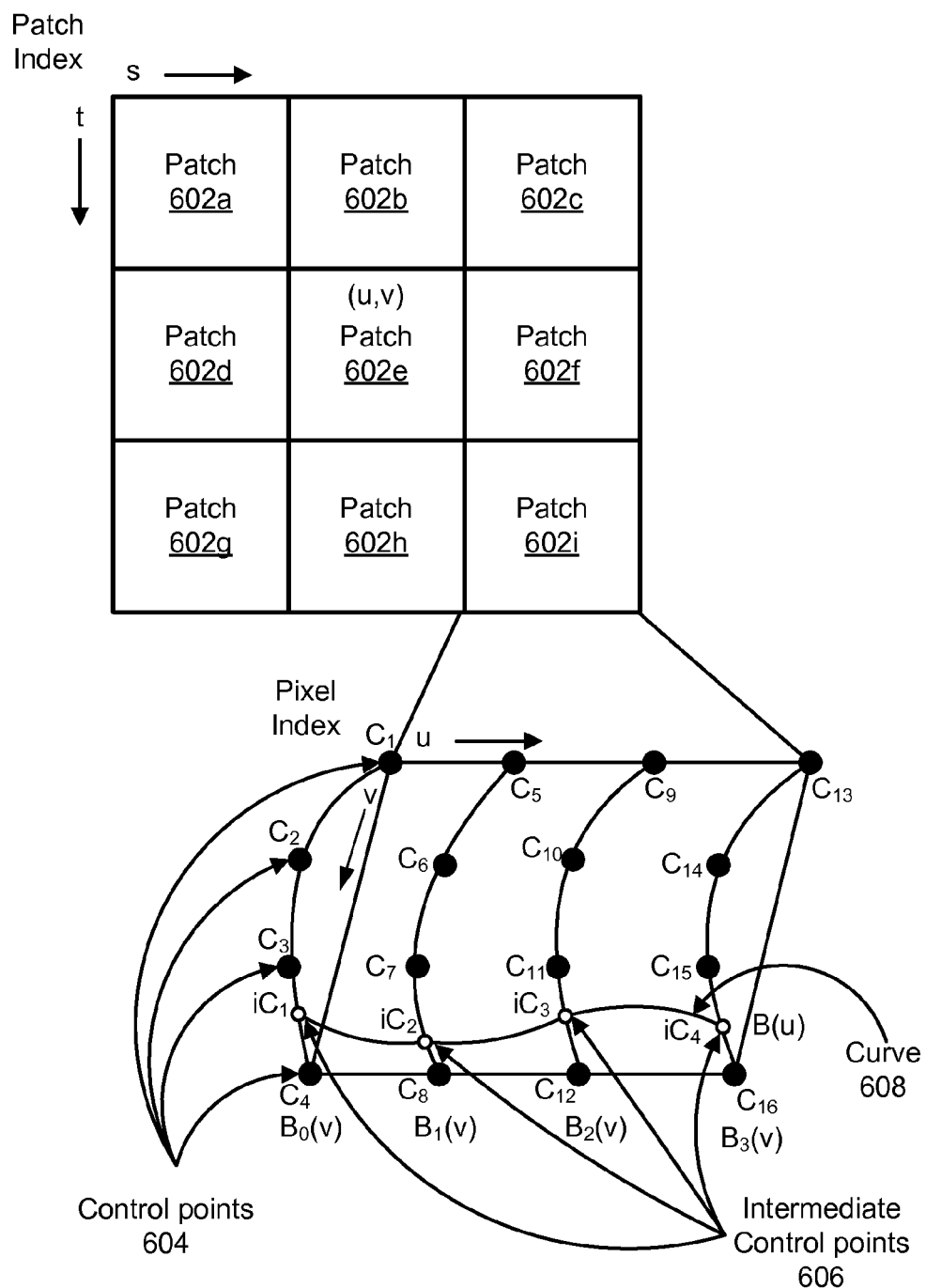
FIG. 6 shows an exemplary patch of a Bezier surface in accordance with one embodiment of the present invention.

FIG. 6 shows an exemplary patch of a Bezier surface in accordance with one embodiment of the present invention. Bezier surface 600 includes patches 602a-i. Exemplary patch 602i includes control points 604 and intermediate control points 606. Exemplary patch 602i corresponds to a portion of the plurality of pixels which Bezier surface 600 is used to correct. Intermediate control points 606 define curve 608 which embodiments of the present invention use to evaluate the gain at each pixel of a row of pixels of the patch and thereby correct each pixel. Patches can be indexed based on a s axis (e.g., horizontally) and a t axis (e.g., vertically). Pixels of a patch can be indexed based on an u axis (e.g., horizontally) and a v axis (e.g., vertically).

Embodiments of present invention calculate intermediate control points for each row of pixels of a patch. In one embodiment, at each pixel of a row of pixels, the intermediate control points are used to determine a gain which is multiplied by the intensity value of the pixel. The intermediate control points are used to correct the row of pixels for a variety of effects including lens shading effects, optical crosstalk, and electrical crosstalk. In another embodiment, "columns of a patch" can be interchanged for "a row of a patch."

In one exemplary embodiment, each of intermediate control points 606 are computed based on the control points vertical to the intermediate control points. The intermediate control points are calculated based on linear interpolations. For example, intermediate control point $iC_1$ is computed based on control points $C_1$, $C_2$, $C_3$, and $C_4$. Similarly, intermediate control point $iC_2$ is computed based on control points $C_5$, $C_6$, $C_7$, and $C_8$. Intermediate control point $iC_3$ is computed based on control points $C_9$, $C_{10}$, $C_{11}$, and $C_{12}$ and intermediate control point $iC_4$ is computed based on control points $C_{13}$, $C_{14}$, $C_{15}$, and $C_{16}$.

Embodiments are thus able to process the image in a patch by patch basis and further process each patch on scan line basis. In one embodiment, patches are processed horizontally and then vertically. For example, an exemplary order of processing may include 602a, 602b, 602c, 602d, 602e, 602f, 602g, 602h, and 602i.

Figure 7:
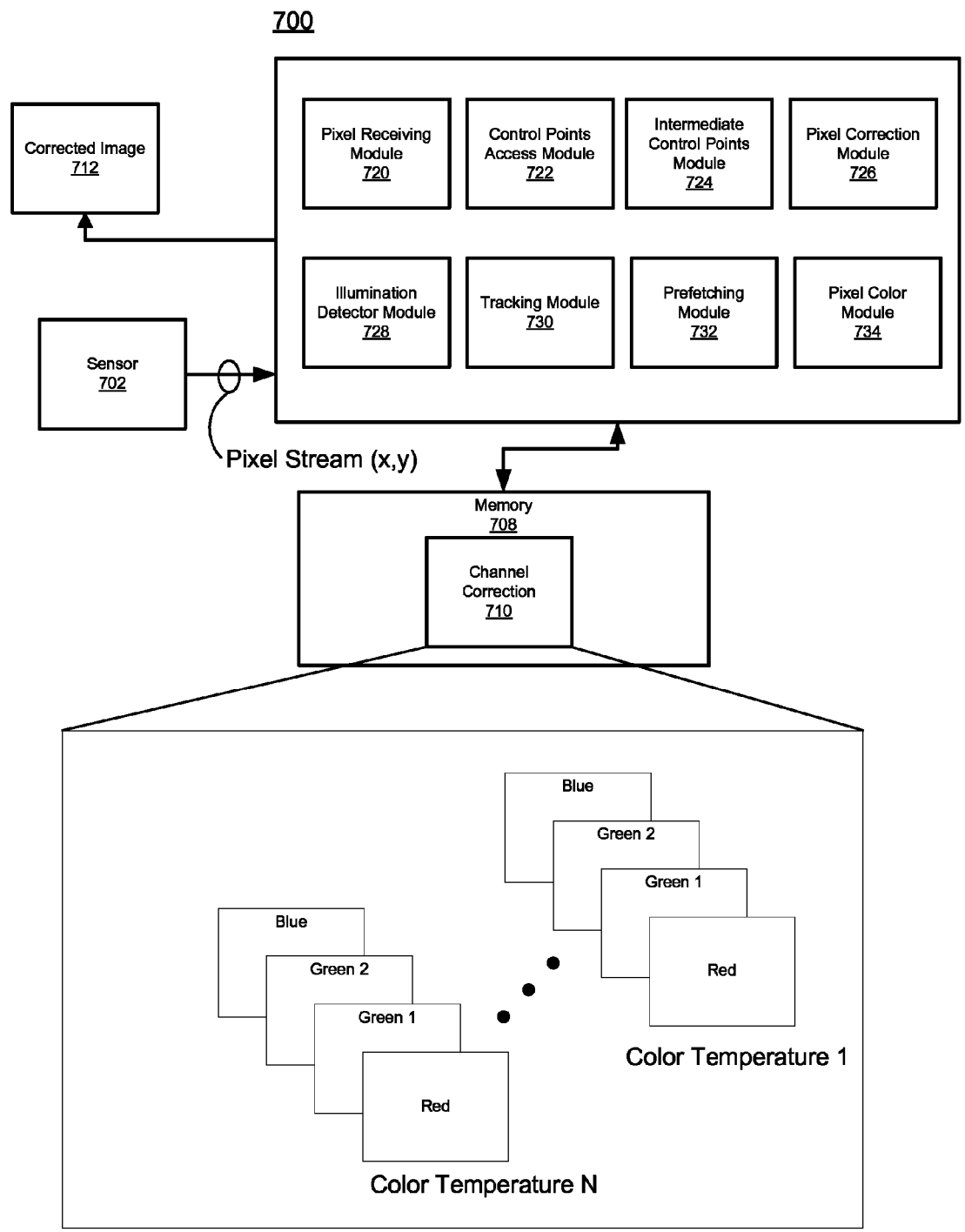
FIG. 7 shows a block diagram of an exemplary system in accordance with one embodiment of the present invention.

FIG. 7 illustrates example components used by various embodiments of the present invention. Although specific components are disclosed in system 700, it should be appreciated that such components are examples. That is, embodiments of the present invention are well suited to having various other components or variations of the components recited in system 700. It is appreciated that the components in system 700 may operate with other components than those presented, and that not all of the components of system 700 may be required to achieve the goals of system 700.

FIG. 7 shows a block diagram of an exemplary system in accordance with one embodiment of the present invention. System 700 includes pixels receiving module 720, control points access module 722, intermediate control points module 724, pixel correction module 726, illumination detector module 728, tracking module 730, prefetching module 732, and pixel color module 734. System 700 receives image data from sensor 702 and outputs correct image 712. In one embodiment, pixels arrive from sensor 702 as a stream, (x,y) counters maintain the current position (e.g., in hardware). The (x,y) position and intensity data can be received per channel. System 700 accesses channel correction information of system memory 708.

Memory 708 includes channel correction information 710. Channel correction information 710 includes sets of control points for the each color channel and each illuminate or color temperature. In one embodiment, channel correction information 710 includes respective sets of control points (e.g., for a Bezier surface) for blue, green 1, green 2, and red for each color temperature. It is appreciated that embodiments of the present invention are operable to process pixels received from any sensor configuration (e.g., interleaved color channels, single color channels, stacked colors channels, etc.).

Pixel receiving module 720 is operable to receive a plurality of pixels from an optical sensor (e.g., sensor 702). Pixel receiving module 720 is operable to receive pixels from sensors of any type (e.g., Bayer, etc.)

Illuminate detector module 728 is operable to detect an illuminate and select a plurality control points based on the illuminate detected for each color channel via control points access module 722. Control points access module 722 is operable to access control points of a spline surface (e.g., Bezier surface). Control points access module 722 accesses channel correction information 710 based on the illuminate detected by illuminate detector module 728.

Intermediate control points module 724 is operable to determine a plurality of intermediate control points for a plurality of pixels corresponding to a patch of the Bezier surface. Embodiments of the present invention compute the intermediate control points by separating the horizontal and vertical computations of a patch. The intermediate control points define the portion of the Bezier surface corresponding to a row of pixels for the patch of the spline surface. The intermediate control points are calculated based on the control points on a scan line of a patch basis. The intermediate control points can be reused once calculated for each pixel of a row of pixels in a patch. Thus, embodiments of the present invention advantageously use the fact that the spline surface values can be separably computed.

In one embodiment, intermediate control points for each color channel are determined (e.g., via linear interpolation). Each set of intermediate control points is calculated based on the control points of the patch of the Bezier surface. As each pixel of a different color channel is received, the corresponding intermediate control points are used to correct each pixel. In one embodiment, four intermediate control points are computed for each scan line of a patch (e.g., row of pixels of a patch). Counters for the location of pixels (e.g., counters tracking u and/or v) may be reset when intermediate control points are calculated for a new patch.

Pixel correction module 726 is operable to correct pixels based on the plurality of intermediate control points. As each pixel is received correction based on the intermediate control points can be performed. A counter can be used to track the pixel location within the row of patch of the color channel. As the next pixel is received, the corresponding value of the curve defined by the intermediate control points is used to correct the pixel. In one embodiment, the correction of pixels comprises a series of linear interpolations based on the de Casteljau algorithm (e.g., for a Bezier surface). The linear interpolations may be performed sequentially by a single linear interpolator or in parallel by a plurality of linear interpolators.

Prefetching module 732 is operable to prefetch a plurality of control points of a second or next patch of the spline surface. Tracking module 730 is operable to track the location of a pixel received within a patch of the spline surface and operable to signal the prefetching module 732 when a pixel is received is within a predetermined range of the end of a row of pixels of the patch.

In one embodiment, tracking module 730 is operable to signal intermediate control points module 724. Tracking module 730 may thus signal prefetching module 732 to prefetch the next set of control points (e.g., for the next adjacent patch or the patch that is first patch in the next row of patches) and signal intermediate control points module 724 to compute the intermediate control points for the first row of the next patch.

Tracking module 730 is operable to detect when processing is approaching the end of a row and end of a column (e.g., the height of a patch). In one embodiment, tracking module 730 comprises a horizontal counter and a vertical counter for tracking the pixel location both horizontally and vertically within a patch.

In one embodiment, tracking module 730 comprises a multiplexer in addition to the counters such that when the end of a row or patch is reached, the multiplexer changes the patch that is accessed by intermediate control points module 724 accesses. This thereby allows intermediate control points module 724 to compute the control points for the next patch and corresponding scan line of the next patch. In another embodiment, a pointer is changed to access the control points for the next patch.

Tracking module 730 is further operable to track the patch of pixels being corrected in relation to the other patches. In one embodiment, s and t are used to index the patches of a Bezier surface (e.g., FIG. 6). Tracking module 730 is further operable to track a mapping of pixels to patches. In one embodiment, u and v are used to map from pixel space to patch space (e.g., FIG. 6). The u and v values may be normalized to go from zero to one. Each increment of the pixel location (e.g., Δu) corresponds to 1/(the number of pixels in a row of pixels in a patch). The spacing of the next pixel can be computed based on the pixel location of boundaries control points. Embodiments of the present invention may thus increment by the spacing between pixels in processing of a patch. The number of pixels in a row of pixels of a patch can be determined based on the control points of the patch.

Pixel color module 734 is operable to select a plurality of intermediate control points based on a color of pixel received. Pixel color module 734 can further select the plurality of intermediate control points corresponding to the color channel of a pixel (e.g., for pixel correction module 726). For example, if a red pixel is received, pixel color module 734 will select the intermediate control points computed for the red channel of a Bezier surface. As the next pixel is received, pixel color module 734 selects the plurality of intermediate control points corresponding to color channel of the next pixel. For example, pixel color module 734 may select a plurality of intermediate control points corresponding to a green color channel for a green pixel.

Figure 8:
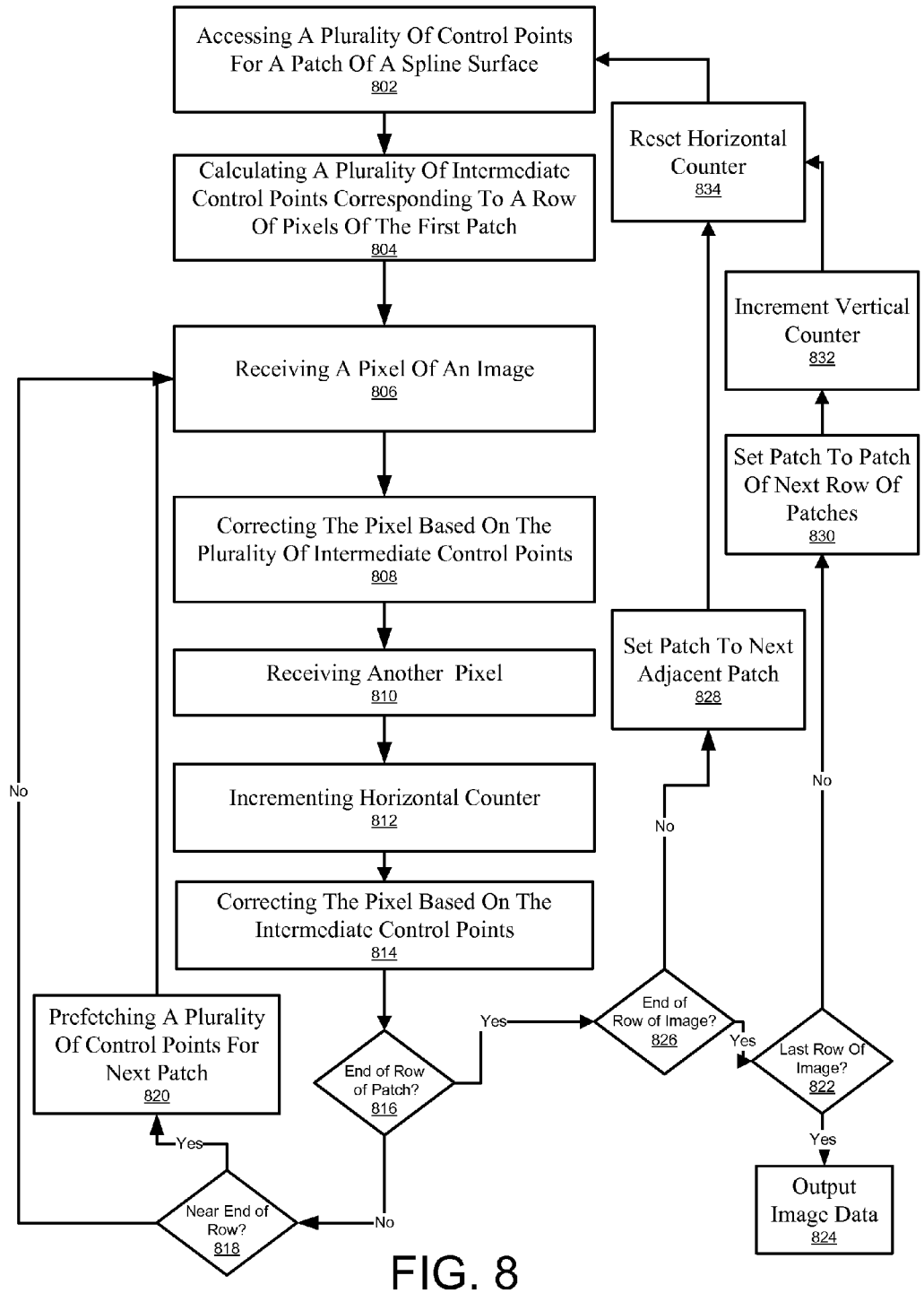
FIG. 8 shows flowchart of an exemplary computer controlled process for image processing in accordance with one embodiment.
Figure 9:
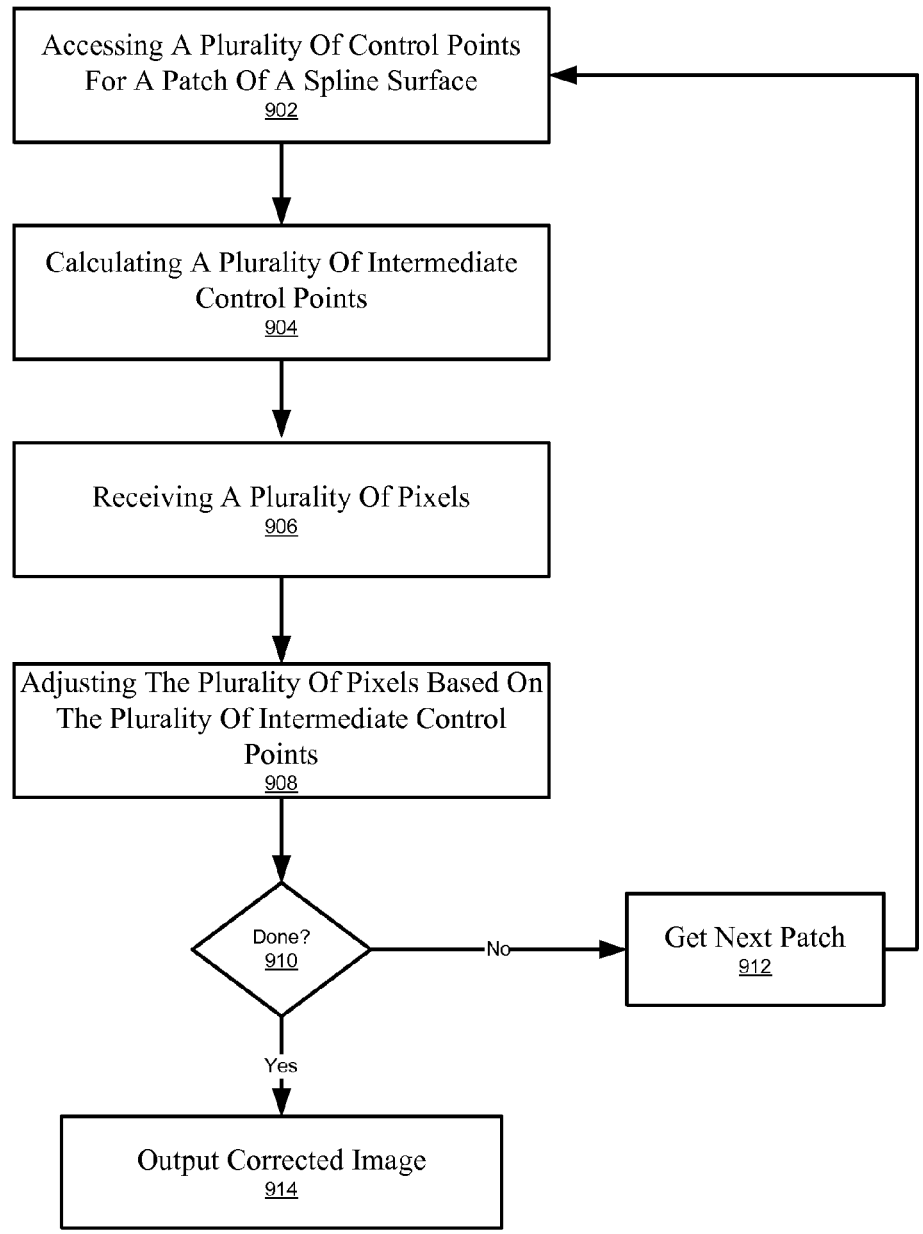
FIG. 9 shows a flowchart of an exemplary computer controlled process for image signal processing of a plurality of patches in accordance with one embodiment.

With reference to FIGS. 8 and 9, exemplary flowcharts 800 and 900 illustrate example processes used by various embodiments of the present invention. Although specific blocks are disclosed in flowcharts 800 and 900, such blocks are exemplary. That is, embodiments are well suited to performing various other blocks or variations of the blocks recited in flowcharts 800 and 900. It is appreciated that the blocks in flowcharts 800 and 900 may be performed in an order different than presented, and that not all of the blocks in flowcharts 800 and 900 may be performed. Flowcharts 800 and 900 include processes that, in various embodiments, are carried out by a processor under the control of computer-readable and computer-executable instructions. Embodiments of the present invention may thus be stored as computer readable media or computer-executable instructions including, but not limited to, a firmware update, software update package, or hardware (e.g., ROM).

FIG. 8 shows flowchart of an exemplary computer controlled process for implementing image processing in accordance with one embodiment. Process 800 corrects for a variety of image irregularities including lens shading, optical crosstalk, and electrical crosstalk.

At block 802, a plurality of control points for a first patch of a spline (e.g., Bezier) surface are accessed within an electronic system. At block 804, a plurality of intermediate control points corresponding to a row of pixels of the first patch are calculated (e.g., via linear interpolation), as described herein.

At block 806, a first pixel of an image is received. At block 808, the first pixel is corrected based on the plurality of intermediate control points. The correction of a pixel based on the plurality of intermediate control points is operable to compensate for lens shading effects, optical crosstalk, electrical crosstalk, and other sensor output irregularities, as described herein. As described herein, the correcting can be performed via linear interpolation. The correction may be computed with fixed precision or floating point precision.

At block 810, a second pixel of the image is received. In one embodiment, wherein the second pixel is horizontally adjacent to the first pixel (e.g., the next pixel of a row of pixels of a patch).

At block 812, a counter is incremented corresponding to a pixel location within the first patch of the spline surface (e.g., Bezier). In one embodiment, the counter corresponds to u or a horizontal axis of a patch and is incremented by Δu representing the spacing between pixels of a single color channel. At block 814, the second pixel is corrected based on the intermediate control points.

At block 816, whether the end of a row of pixels of a patch has been reached is determined. If the end of a row of pixels of a patch has been reached, block 826 is performed. If the end of a row of pixels of a patch has not been reached, block 818 is performed.

At block 818, whether the processing of pixels is nearing the end of a row is determined. If the current pixel that was corrected is within a predetermined range of an end of a row, block 820 is performed. If the current pixel is not within the predetermined range, block 806 is performed and another pixel of the image is received. At block 820, a plurality of control points for a second patch of the spline surface (e.g., Bezier) are prefetched. If the current pixel is near the end of a patch, the next adjacent patch can be prefetched. If the current pixel is near the end of a row of the image, the next patch of the next row of patches can be prefetched (e.g., the first patch of the second row of patches).

At block 826, whether the end of a row of the image has been reached is determined. If the end of a row of the image has been reached, block 822 is performed. If the end of a row of the image has not been reached, block 828 is performed.

At block 822, whether the row of pixels being processed is the last row of the image is determined. If the last row of the image has been processed, block 824 is performed and the corrected image data is output. If there are more rows of pixels and patches of the image to process, block 830 is performed.

At block 828, the current patch is set to the next adjacent patch. In one embodiment, when a row of a patch has been corrected the next adjacent patch is selected and corrected on the corresponding row. For example, the current patch may be set from patch 602b to patch 602c. Block 834 is then performed.

At block 830, the current patch is set to the patch of the next row of patches. In one embodiment, when the last row of a patch and end of a row of the image has been reached the next patch of the next row of patches is selected and correction starts from the first row of the patch. For example, the current patch may be set from patch 602c to 602d.

In one embodiment, block 832 is then performed and the vertical counter (e.g., v) is incremented corresponding to the next row of the image to be processed. Block 834 is then performed and the horizontal counter (e.g., u) is then reset (e.g., to zero).

In one exemplary embodiment, portions of process 800 are performed by the pseudo code of Table 1.

TABLE 1

Exemplary Pseudo Code

Pixel stream received with pixel intensity value and (x,y) value.
(x,y) counters are updated on each pixel value received for the frame:
   v=0
   u=0
   New Row:
     Starting a first patch, compute or receive Δv and Δu for patch
and obtain control points for patch
     Based on v, use linear interpolation to compute intermediary control
     points for row
     Same Patch:
     Compute gain value of (u,v) using intermediate control points
     Compute new pixel value = old pixel value * gain
     Increment to next pixel (u=u+Δu)
     If within same patch then return to Same Patch
     If end of row of image, then increment to next row v=v+Δv and u=0
     and New Patch else u=0 and New Patch
   New Patch:
     Compute or receive Δu and Δv for new patch and obtain control
     points for new patch
     Based on v, use linear interpolation to compute intermediary
     control points for row
     Compute gain value of (u,v) using intermediate control points
     Compute new pixel value = old pixel value * gain
     Increment to next pixel (u=u+Δu)
     If within same patch then return to Same Patch
     If end of row of image, then increment to next row v=v+Δv and
     u=0 and New Patch else u=0 and New Patch In one exemplary embodiment, after the intermediate control points are calculated (e.g., via linear interpolation), the u coordinate (e.g., horizontal coordinate of a patch) is used to compute the gain value using interpolation. Table 2 show exemplary equations for gain and corrected pixel values.

Gain=$F(u, \Delta u, iC_1-iC_n)$, where u is horizontal position in the row the patch, Δu is the spacing between pixels (e.g., 1/(the number of pixels in a row of a patch), and $iC_1-iC_n$ are the intermediate control points corresponding to the row of pixels of the patch.

Corrected Pixel value=Gain*Pixel value, where, in one embodiment, pixel value comprises an intensity value Table 2—Exemplary Gain and Correction Equations In one exemplary embodiment, on each new pixel, the u is updated by Δu (e.g., $u_{i+1}=u_i+\Delta u$) and the correction is applied. This may be repeated until a new patch is entered or a row of the image is completed and the location being processed drops down to the next row. When a new patch is entered, the control points of the patch are accessed and new intermediate control points are computed, u is set to zero, and the new Δu and new Δv are accessed for the new patch.

In one exemplary embodiment, when the next row is entered, the v value is incremented (e.g., $v_{j+1}=u_j+\Delta v$) and u is set to zero. New intermediate control points are calculated based on the new v value. If a new patch was entered by moving down a row, the new Δu and Δv are obtained. Within each patch Δu and Δv are fixed depending on the number of pixels in each direction covered by the patch.

In one exemplary embodiment, the hardware receives image pixels from the sensor or previous processing stages in a stream, one pixel at a time. Each pixel is given a unique address, x and y. The x and y addresses are reset to zero at the start of each frame. The x is incremented by one as each new pixel in the stream arrives. When the end of the each scan line is reached (e.g., end of a row of an image or sensor) the y address is incremented by one and the x address is reset to zero. The end of the scan line is specified by the width of the sensor. Similarly, the y address is reset to zero after the last scan line. The last scan line is specified by the height of the sensor.

In one exemplary embodiment, each patch may be defined by its dimensions: patch_width and patch_height and its internal spacing Δu and Δv, where Δu=1/patch_width and Δv=1/patch_height. In one exemplary embodiment, the hardware may use the x, y pixel address to determine the patch address, s and t. The patch address is set to s=0 and t=0 when the pixel address is x=0 and y=0. The hardware maintains intra-pixel addresses xp and yp. Address xp is set to zero whenever the patch address changes (e.g., whenever the pixel stream enters a new patch) otherwise xp is incremented whenever a new pixel from the pixel stream arrives. The yp address is incremented whenever the end of the scan line is reached, similar to the y address. The yp address is reset to zero whenever the patch address t changes.

In one exemplary embodiment, when the xp address reaches patch_width, the s patch address is incremented. When the x pixel address reaches the end of the scan line, the condition of x being equal to width (e.g., image width), s is reset to zero. When the yp address reaches patch_height, the t patch address is incremented. When the y pixel address reaches the end of the sensor image, the condition of y being equal to height (e.g., image height), t is reset to zero.

In one exemplary embodiment, each Bezier patch, indexed by s and t, is a two dimensional function $p_{s,t}(u,v)$. The independent variables u and v may take on values between zero and one. Mathematically, u and v reside in the domain [0,1]. Variables u and v are incremented by Δu and Δv respectively at the same time as xp and yp.

In one exemplary embodiment, the hardware uses each value of s, t, u, and v to evaluate the patch $p_{s,t}(u,v)$ as a separable function. The evaluation is separable in the sense that the evaluation is separated into a vertical computation followed by a similar computation in the horizontal direction. The vertical computation defines four horizontal intermediate control points, $iC_1$, $iC_2$, $iC_3$, and $iC_4$, for each new v. The four control points define a 1 dimensional horizontal Bezier curve, B(u). Each intermediate control point is based on an evaluation of single Bezier curve that is a function of the vertical variable, v. Since there are four intermediate control points, four Bezier curves are evaluated (e.g., $B_0(v)$, $B_1(v)$, $B_2(v)$, and $B_3(v)$, where $B_0(v)$ is a based on control points $C_1$, $C_2$, $C_3$, and $C_4$, $B_1(v)$ is based on control points $C_5$, $C_6$, $C_7$, and $C_8$, $B_2(v)$ is based on control points $C_9$, $C_{10}$, $C_{11}$, and $C_{12}$, and $B_3(v)$ is based on control points $C_{13}$, $C_{14}$, $C_{15}$, and $C_{16}$). Each of the vertical Bezier curves has four control points. The control pints are from the four vertical columns of the four control points for the patch indexed by s and t.

FIG. 9 shows a flowchart of an exemplary computer controlled process for image signal processing of a plurality of patches in accordance with another embodiment of the present invention. As described herein, process 900 corrects for a variety of image irregularities including lens shading, optical crosstalk, and electrical crosstalk.

At block 902, a plurality of control points for a patch of a spline surface is accessed within an electronic system.

At block 904, a plurality of intermediate control points are calculated corresponding to a row of pixels for each color channel of the image. As described herein, the intermediate control points define a Bezier curve corresponding to the row of pixels.

At block 906, a plurality of pixels is received. In one embodiment, the plurality of pixels comprises a row of pixels corresponding to a patch of the spline surface and the plurality of pixels further comprises a plurality of color channels of an image.

At block 908, the plurality of pixels is adjusted based on the plurality of intermediate control points. The adjusting compensates for a variety of irregularities including lens shading. As described herein, the adjusting of the plurality of pixels may be performed (e.g., via linear interpolation) sequentially, in parallel, or a combination thereof.

At block 910, whether the adjusting of the image is done is determined (e.g., whether there are patches of the image left to process). If the last patch has been corrected, block 914 is performed and the corrected image is output. If there are more patches of the image to be corrected, block 912 is performed.

At block 912, the next patch is retrieved. Block 902 may then be performed as the retrieved patch is processed. In one embodiment, the next patch may be prefetched so that the patch is ready for processing.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for image signal processing, said method comprising:
    accessing, within an electronic system, a plurality of control points for a first patch of a spline surface, wherein said spline surface corresponds to an optical sensor;
    calculating a plurality of intermediate control points corresponding to a row of pixels of said first patch;
    receiving a first pixel of an image; and
    correcting said first pixel based on said plurality of intermediate control points, wherein said first pixel is located in said row of pixels of said first patch.

2. A method as described in claim 1 further comprising:
    receiving a second pixel of said image wherein said second pixel is horizontally adjacent to said first pixel;
    incrementing a counter corresponding to a pixel location within said first patch of spline surface; and
    correcting second pixel based on said plurality of intermediate control points, wherein said second pixel is located in said row of pixels of said first patch.

3. A method as described in claim 1 further comprising prefetching a plurality of control points for a second patch of said spline surface.

4. A method as described in claim 1 wherein said correcting compensates for lens shading effects.

5. A method as described in claim 1 wherein said correcting compensates for optical crosstalk.

6. A method as described in claim 1 wherein said correcting compensates for electrical crosstalk.

7. A method as described in claim 1 wherein said calculating of intermediate control points is performed via linear interpolation based on the plurality of control points.

8. A method as described in claim 1 wherein said correcting is based on fixed precision.

9. A method as described in claim 1 wherein said correcting is based on floating precision.

10. An image signal processing system comprising:
    a pixel receiving module operable to receive a plurality of pixels from an optical sensor;
    a control points access module operable to access control points of a spline surface, wherein said spline surface corresponds to an optical sensor;
    an intermediate control points module operable to determine a plurality of intermediate control points for a plurality of pixels corresponding to a first patch of said spline surface; and
    a pixel correction module operable to correct pixels based on said plurality of intermediate control points.

11. A system as described in claim 10 further comprising:
    an illuminate detector operable to detect an illuminate and select a plurality control points based on said illuminate for each color channel.

12. A system as described in claim 10 further comprising:
    a prefetching module operable to prefetch a plurality of control points of a second patch of said spline surface.

13. A system as described in claim 10 further comprising:
    a tracking module operable to track the location of a pixel received within said first patch of said spline surface and operable to signal said prefetching module when a pixel is received is within a predetermined range of the end of a row of pixels of said first patch.

14. A system as described in claim 10 further comprising:
    a pixel color module operable to select a plurality of intermediate control points based on a color of pixel received.

15. A method for image signal processing comprising:
    accessing, within an electronic system, a plurality of control points for a patch of a spline surface, wherein said spline corresponds to an optical sensor;
    calculating a plurality of intermediate control points corresponding to a row of pixels for each color channel of an image;
    receiving a plurality of pixels wherein said plurality of pixels comprises pixels located on a row of pixels corresponding to said patch of said spline surface and wherein said plurality of pixels comprises a plurality of color channels of an image; and
    adjusting said plurality of pixels based on said plurality of intermediate control points and respective horizontal locations of said plurality of pixels.

16. A method as described in claim 15 wherein said intermediate control points define a spline curve corresponding to said row of pixels.

17. A method as described in claim 15 wherein said adjusting said plurality of pixels is performed sequentially.

18. A method as described in claim 15 wherein said adjusting said plurality of pixels is performed in parallel.

19. A method as described in claim 15 wherein said adjusting compensates for lens shading.

20. A method as described in claim 15 wherein said adjusting comprises linear interpolation.

* * * * *